Jan. 9, 1940.  F. P. MILLER  2,186,423
CUTTING TOOL
Filed March 17, 1938
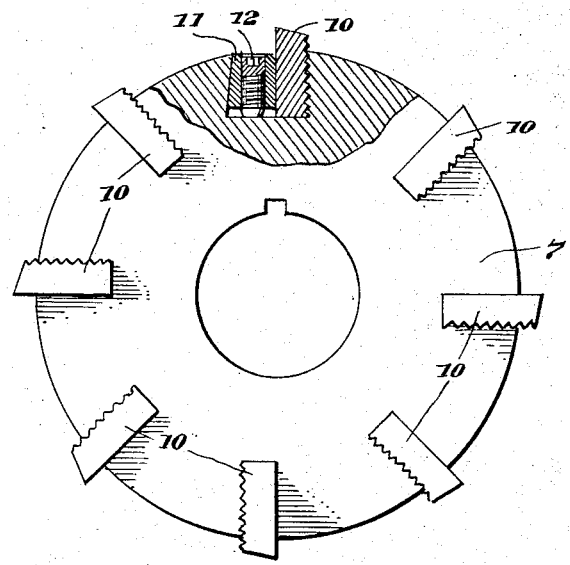
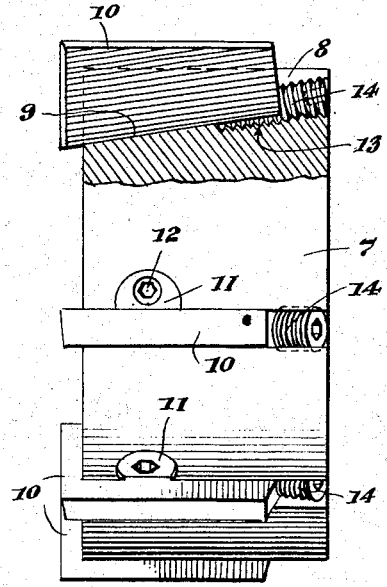
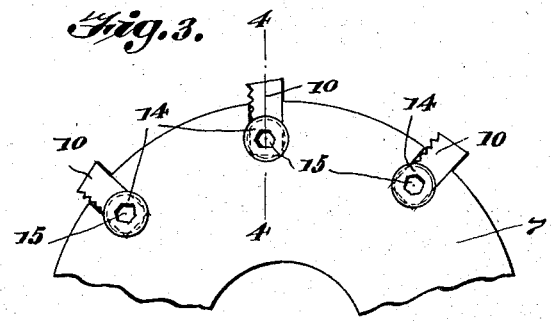
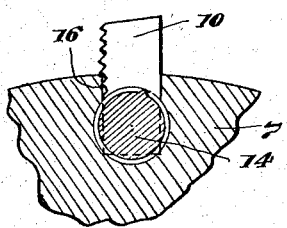
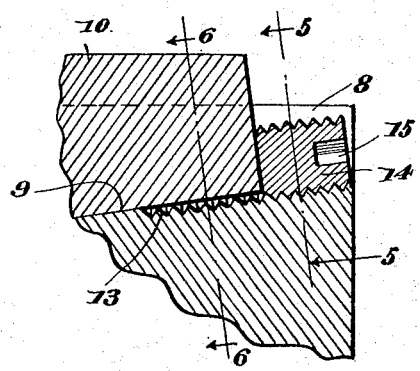
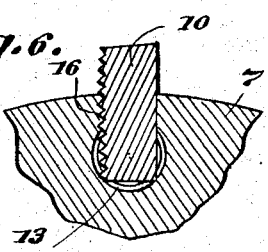
Inventor
FRANK P. MILLER
By E. F. Salter
Attorney Patented Jan. 9, 1940

2,186,423

UNITED STATES PATENT OFFICE 2,186,423

CUTTING TOOL

Frank P. Miller, Meadville, Pa.

Application March 17, 1938, Serial No. 196,509

10 Claims. (Cl. 29—105)

This invention relates to the art of inserted blade cutting tools of the type employed as milling cutters, boring heads, counterbores, reamers, and similar metal-cutting tools in which a rotary circular head is provided with axially extending, radial blade receiving slots around its periphery; with means for locking the blades in their slots, and with means at the inner or rear ends of the slots for effecting axial blade adjustment and for resisting the rearward axial thrust of the blades when the tool is operatively engaged with its work.

In service, the blades of such tools are subjected to severe rearward thrust stresses and in heavy-duty work it is important that the usual frictional blade-locking means be supplemented by adjustable positive stop means engaged with the rear ends of the blades to make doubly sure that the blades will not shift rearwardly. The stop means in addition to functioning as such also provides for forward adjustment of the blades by fine accurate increments so that all blades may be adjusted exactly alike in preparation for the resharpening of the tool and to compensate for wear.

The present invention is an improvement upon inserted blade cutter heads in which the axially extending blade slots open to both the front and rear faces of the head, the opposed side walls of the blade slots having partially threaded grooves at their rear end portions providing threaded socket means for a back-up screw, such as in my prior Patent No. 1,358,013 of Nov. 9, 1920.

An object of the invention is to provide an improved manner of mounting back-up screws in inserted blade cutter heads, whereby the holding power of the screw is very greatly increased.

Another object is to provide an improved back-up screw mount permitting an extreme shallowness of blade slot at the rear of a cutter head without possibility of any portion of the screw projecting radially beyond the periphery of the head.

Other objects will be apparent to those skilled in the art.

An embodiment of the invention is illustrated in the accompanying drawing, in which:

Figure 1 is a front end elevation of a cutter head, partly in section, having blades mounted therein in accordance with the invention.

Figure 2 is a side elevation of the cutter, partly in section.

Figure 3 is a fragmentary rear end elevation of the cutter.

Figure 4 is a fragmentary section taken on the line 4—4 of Figure 3.

Figure 5 is a fragmentary section taken on the line 5—5 of Figure 4.

Figure 6 is a fragmentary section taken on the line 6—6 of Figure 4.

The invention is shown as applied to a cylindrical cutter head 7 provided at spaced points around its periphery with axially extending, radially disposed blade receiving slots 8 which open at their ends to the front and rear of the cutter. The type of cutter here shown is one in which the blade slot bottoms are inclined with respect to the axis of the head. In the disclosed embodiment the bottom 9 of each slot diverges rearwardly from the axis of the cutter, making the rear end of the slot quite shallow as compared to its front end. Each slot receives an inserted blade 10 whose bottom edge is inclined complementary to the slot bottom. The trailing face of each blade is provided with parallel longitudinal serrations which interengage complemental serrations in the adjacent side wall of its slot, as seen in Figure 1; the serrations of both blade and slot wall being parallel to the slot bottom and bottom edge of the blade. The serrations of blade and slot provide means for determining and holding radial adjustments of the blades, and the blades are locked in set position by means of lock wedges 11 working in sockets provided in the body of the cutter head and opening to the leading wall of each blade slot. Each wedge has a flat side adapted to bear against the adjacent leading face of a blade and is operated by means of an axially disposed lifting screw 12 which bears against the bottom of the wedge socket.

The rear end portion of each blade slot 8 is screw threaded in its side and bottom walls to form a threaded socket 13 for a back-up screw 14 whose inner or forward end engages the rear end of the blade 10, and whose outer end is formed with a countersunk tool-engageable socket 15.

The socket 13 is so positioned that its axis parallels the plane of the slot bottom 9, and slightly radially outward thereof, and the slot axis occupies the radial plane of the longitudinal median of the blade slot. Due to this arrangement a back-up screw when threaded into its socket has a substantial threaded engagement in the side walls of the blade slot as well as in its bottom wall, the threads being interrupted by the slot bottom corners. In other words, the screw has a threaded holding engagement with the socket over substantially 270 degrees of its circumference.

The angle of inclination of the screw socket 13 relative to the axis of the cutter head is such that no portion of the back-up screw when engaged in its socket will project radially beyond the periphery of the cutter head.

An important feature of the invention lies in the fact that the plane of the blade slot bottom parallels the axis of the back-up screw socket and passes longitudinally through the screw socket between its axis and its periphery, regardless of the slot bottom taper or its direction. In the illustrated embodiment, where the taper of the blade slot bottom is rearwardly divergent from the cutter head axis, this relative arrangement permits of making the blade slot very shallow at its rear end, thus allowing a sharp taper of blade slot with greater strength of the head than is usual. The sharp taper is highly desirable as a radial blade adjustment means, but where obtained by increasing the depth of the blade slot at the front end it is at the sacrifice of material which weakens the cutter head. By making the slot shallow at its rear end the mean depth of blade slot is lessened, so that the taper is increased at an actual increase in strength of the cutter head; less material being removed in cutting the slot.

In service, the cutter blades are inserted endwise within their slots at the desired radially adjusted engagement of the blade and slot wall serrations, with their rear ends engaged against the back-up screws 14. The back-up screws are operated to effect the final accurate axial adjustment of the blades and the blades are then locked in set position by manipulation of the lock wedges 11.

Due to the fact that approximately three-fourths of the peripheral area of each back-up screw has a threaded engagement with its socket, the screws will have very great holding power and will successfully withstand far greater loads than are possible in the construction of my aforesaid prior patent.

Having thus described the invention, what is claimed is:

1. In a cutting tool, a head having therein a blade receiving slot and a screw threaded socket extending longitudinally of the slot from one end, and said socket being formed in both side walls and the bottom of the slot.

2. In a cutting tool, a rotatable head having therein a blade receiving slot axially thereof and a screw threaded socket extending longitudinally of the slot from one end in both side walls and the bottom of the slot, and the bottom of said slot being disposed in a plane which passes longitudinally through the socket between the socket axis and its periphery.

3. In a cutting tool, a rotatable head having therein a radial blade receiving slot extending axially thereof and a screw threaded socket extending longitudinally of the slot from one end and formed in both side walls and bottom of the slot, the bottom of the slot being disposed in a plane which passes longitudinally through the socket between the socket axis and its periphery, and the axis of said socket being disposed in the longitudinal median plane of the blade slot.

4. In a cutting tool, a head provided with a blade receiving slot having an inclined bottom and a screw threaded socket formed in both side walls and bottom of the slot and extending longitudinally thereof from one end, the axis of said socket being parallel to the blade slot bottom, and said slot bottom being disposed in a plane which passes longitudinally through the socket between the socket axis and its periphery.

5. In a cutting tool, a head provided with a blade receiving slot having an inclined bottom and a screw threaded socket formed in both side walls and bottom of the slot and extending longitudinally thereof from one end, the axis of said socket being in the longitudinal median plane of said slot and parallel to the slot bottom, and the bottom of said slot being in a plane which passes longitudinally through the socket between the socket axis and its periphery.

6. An inserted blade cutter comprising a substantially cylindrical head having therein a radial blade receiving slot extending axially thereof from front to rear and open to the periphery of the head and a screw threaded socket formed in both side walls and the bottom of the slot longitudinally inward from its rear end, said socket being disposed in its entirety radially inwardly of the periphery of the head and with its axis in the longitudinal median plane of the slot, the bottom of said slot being in a plane which passes longitudinally through the socket between the socket axis and its periphery, a cutter blade arranged in said slot, and a screw in the socket engaging the rear end of said blade.

7. An inserted blade cutter comprising a substantially cylindrical head having therein a radial blade receiving slot extending axially thereof from front to rear and open to the periphery of the head, the bottom of said slot being inclined with respect to the axis of the head, said head being provided with a screw threaded socket formed in both side walls and the bottom of the slot longitudinally inward from its rear end and entirely radially inwardly of the periphery of the head, said socket having its axis in the longitudinal median plane of the blade slot and inclined parallel to the slot bottom, the bottom of said slot being in a plane which passes longitudinally through the socket between the socket axis and its periphery, a cutter blade arranged in said slot, and a screw in the socket engaging the rear end of the blade.

8. In an inserted blade cutter, a cutter head having therein a blade receiving slot open at the rear and a screw threaded socket formed in the material of both side walls and bottom of the slot inwardly from its rear end through an arc of substantially 270 degrees.

9. In an inserted blade cutter, a cutter head having therein a blade receiving slot open at the rear and a screw threaded socket cut in the bottom and side walls of the slot inwardly from its rear end with the axis of the socket in the longitudinal median plane of the slot.

10. In a cutting tool, a head having a radial blade receiving slot open to the periphery of the head and the front and rear faces thereof, a blade in said slot, both side walls and the bottom wall of said slot being threaded to define a socket within and extending lengthwise of the slot, and a back-up adjusting screw threaded into said socket in operative relation to the rear end of said blade.

FRANK P. MILLER.